US006954792B2

(12) United States Patent
Kang et al.

(10) Patent No.: US 6,954,792 B2
(45) Date of Patent: Oct. 11, 2005

(54) PLUGGABLE AUTHENTICATION AND ACCESS CONTROL FOR A MESSAGING SYSTEM

(75) Inventors: Amy H. Kang, Mountain View, CA (US); George Tharakan, Sunnyvale, CA (US); Joseph F. Di Pol, Sunnyvale, CA (US); Christopher S. Kasso, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 841 days.

(21) Appl. No.: 09/896,090

(22) Filed: Jun. 29, 2001

(65) Prior Publication Data

US 2003/0005117 A1 Jan. 2, 2003

(51) Int. Cl.$^7$ .............................................. G06F 15/16
(52) U.S. Cl. ...................... 709/229; 709/203; 709/227; 713/201
(58) Field of Search ................................ 709/201–203, 709/217–220, 227–229, 245, 223, 225; 713/200, 201, 185

(56) References Cited

U.S. PATENT DOCUMENTS

| | | | |
|---|---|---|---|
| 5,987,134 A | * 11/1999 | Shin et al. .................... | 709/229 |
| 6,223,289 B1 | 4/2001 | Wall et al. .................... | 713/201 |
| 6,351,776 B1 | * 2/2002 | O'Brien et al. ............. | 709/245 |
| 6,377,691 B1 | * 4/2002 | Swift et al. ................... | 380/277 |
| 6,615,264 B1 | * 9/2003 | Stoltz et al. ................. | 709/227 |
| 6,651,168 B1 | * 11/2003 | Kao et al. .................... | 713/185 |
| 6,671,805 B1 | * 12/2003 | Brown et al. ................ | 713/185 |
| 6,711,681 B1 | * 3/2004 | Al-Salqan et al. .......... | 709/227 |
| 6,802,000 B1 | * 10/2004 | Greene et al. ............... | 713/168 |
| 6,802,009 B1 | * 10/2004 | Godwin ........................ | 713/200 |

OTHER PUBLICATIONS

Samar, Vipin; Unified Login with Pluggable Authentication Modules (PAM); Jan. 1996; Proceedings of 3rd ACM conference on Computer and Communications security; ACM 0–89791–829–0/96/03; pp. 1–10.*
Morgan, Andrew; Pluggable Authentication Modules for Linux: Dec. 1997, Linux Journal, vol. 1997, Issue 44es, Artic No. 1.*
Softwired, "Access Control," received May 15, 2001, pp. 29–35.
"Directory SDK for Java 4.0 Programmer's Guide: Using SASL Authentication," Netscape Communications Corp., 1999, 7 pages.

(Continued)

Primary Examiner—Moustafa M. Meky
(74) Attorney, Agent, or Firm—Robert C. Kowert; Meyertons, Hood, Kivlin, Kowert & Goetzel, P.C.

(57) ABSTRACT

A system and method for providing pluggable authentication and access control in computer systems and services are described. The authentication and access control process may be categorized into three components: an authentication protocol, a user repository and an access control model. In one embodiment, the authentication and access control mechanism may be implemented as three pluggable modules: an authentication protocol handler module for the authenticator side, an authentication protocol handler for the side to be authenticated, and an access control context module on the authenticator side. The pluggable modules may be exchangeable to support a variety of authentication types, user repositories, and access control models. The authentication protocol handlers provide symmetrical methods to handle requests and responses in the authentication process that reflect the symmetrical nature of the authentication process.

67 Claims, 7 Drawing Sheets

OTHER PUBLICATIONS

"Simple Authentication and Security Layer (SASL)," Network Working Group, The Internet Society, 1997, 14 pages.

Jun Li, et al., "Securing Distributed Adaptation," In Proceedings of the Fourth IEEE Conference on Open Architectures and Network Programming (OPENARCH 2001), Apr. 2001, 12 pages.

Naomaru Itoi, et al, "Pluggable Authentication Module for Windows NT," Proceedings of $2^{nd}$ USENIX Windows NT Symposium, Aug. 1998, USENIX, ppgs. 97–108.

Charlie Lai, et al., "User Authentication and Authorization in the Java ™ Platform," Published in the Proceedings of the $15^{th}$ Annual Computer Security Applications Conference, Dec. 1999, 9 pages.

"Chapter 9:Pluggable Authentication API," iPlanet Portal Server Reference Guide, May 4, 2000, Netscape Communications Corp., 15 pages.

Sun Microsystems, Inc., Java™ Message Queue Quickstart Guide, V1.1, Revision A, May 2000, 145 pages.

* cited by examiner

PLUGGABLE AUTHENTICATION AND ACCESS CONTROL FOR A MESSAGING SYSTEM

BACKGROUND OF THE INVENTION

1. Field of the Invention

This invention relates to networked computer systems, and more particularly to a system and method for providing pluggable authentication and access control in computer systems and services.

2. Description of the Related Art

Enterprise Messaging Systems

Enterprise messaging systems may be developed using a messaging service such as JMS. An enterprise messaging system may be used to integrate distributed, loosely coupled applications/systems in a way that provides for dynamic topologies of cooperating systems/services. Enterprise messaging systems typically need to address common messaging related problems such as:

Guaranteed message delivery (e.g. persistence, durable interests, "at least once" and "once and only once" message delivery guarantees, transactions etc). Messages from one component to another must not be lost due to network or system failure. This means the system must be able to guarantee that a message is successfully delivered.

Asynchronous delivery. For large numbers of components to be able to exchange messages simultaneously, and support high-density throughputs, the sending of a message cannot depend upon the readiness of the consumer to immediately receive it. If a consumer is busy or offline, the system must allow for a message to be sent and subsequently received when the consumer is ready. This is known as asynchronous message delivery, popularly known as store-and-forward messaging.

Various message delivery models (e.g. publish and subscribe or point-to-point).

Transport independence.

Security The messaging system may support basic security features: authentication of users, authorized access to messages and resources, and on-the-wire encryption.

Leveraging an enterprise messaging system in developing business solutions allows developers to focus on their application/business logic rather than on implementing the underlying messaging layer.

iPlanet E-Commerce Solutions' iMQ (iPlanet Message Queue), formerly offered by Sun Microsystems as JMQ (Java Message Queue) is an example of an enterprise messaging system. iMQ may use a "hub and spoke" architecture. Clients use an iMQ client library to exchange messages with an iMQ message service, which may be implemented using messaging servers (also referred to as "brokers"). iMQ may also be used in serverless message service environments (e.g. peer-to-peer environments). iMQ is Java Message Service (JMS)-compliant. JMS is an application program interface (API) from Sun Microsystems that supports messaging between computers in a network. JMS provides a standard interface (API) for messaging providers to implement, thus providing a common messaging interface for Java programs to use.

In an enterprise messaging system, clients exchange messages with a messaging server using a message exchange protocol. The messaging server then may route the messages based upon properties of the messages. Typically, the message exchange protocol requires a direct, fully bidirectional reliable transport connection between the client and the messaging server, such as a TCP (Transport Control Protocol) or SSL (Secure Sockets Layer) connection.

NIS (Network Information System)

NIS (Network Information System) is a network naming and administration system for smaller networks that was developed by Sun Microsystems. NIS+ is a later version that provides additional security and other facilities. Using NIS, each host client or server computer in the system has knowledge about the entire system. A user at any host can get access to files or applications on any host in the network with a single user identification and password. NIS is intended for use on local area networks. NIS uses the client/server model and the Remote Procedure Call (RPC) interface for communication between hosts. NIS consists of a server, a library of client programs, and some administrative tools. NIS is often used with the Network File System (NFS). NIS is a UNIX-based program.

Lightweight Directory Access Protocol (LDAP)

LDAP (Lightweight Directory Access Protocol) is a software protocol for enabling the location of organizations, individuals, and other resources such as files and devices in a network, whether on the Internet or on a corporate intranet. In a network, a directory tells where in the network something is located. LDAP enables searching without knowledge of the domain name. LDAP directories can perform many of the same functions as a database, storing several thousand names of individuals or storing other important information. LDAP directories are typically designed to support fast access and searches. LDAP directories typically store data in a hierarchical structure.

MD5

MD5 is a message digest algorithm that is used to verify data integrity through the creation of a 128-bit message digest from data input (which may be a message of any length) that is claimed to be as unique to that specific data as a fingerprint is to the specific individual. MD5, which was developed by Professor Ronald L. Rivest of MIT, is intended for use with digital signature applications, which require that large files must be compressed by a secure method before being encrypted with a secret key, under a public key cryptosystem. MD5 is currently a standard, Internet Engineering Task Force (IETF) Request for Comments (RFC) 1321.

SUMMARY OF THE INVENTION

A system and method for providing pluggable authentication and access control in computer systems and services are described. These systems and services may include connection-based networked computer systems such as client-server systems, connectionless (e.g. session-based) computer systems, point-to-point systems, and messaging systems. A "client" may be any application running on one side of the network; a "server" typically provides services to the client application, running on the other side of the network. Authentication is the process of verifying someone's identity. Access control (authorization) relates to controlling access to protected resources in a system, i.e. determining who can access what protected resources. A pluggable authentication and access control mechanism may be provided that allows replacement of an authentication and/or access control module or modules at or after deployment of the system components. As an example, in a client-server system, the authentication and access control process may be categorized into three components:

An authentication protocol that defines how the client and server exchange and interpret authentication information.

A user repository for storing user and credential information.

An access control model that may define what resources are protected, the method or methods of protection, and where the authorization information is stored.

Embodiments of an authentication and access control mechanism that provide pluggability for all three components are described. In one embodiment, the authentication protocol may be changed by plugging in a different authentication protocol handler module or modules. In one embodiment, the user repository may be changed without requiring the change of the authentication protocol handler module or modules. In one embodiment, the access control model may also be changed, for example based upon the user repository being used, by plugging in a different access control module or modules. This pluggability helps to make the authentication and access control mechanism adaptable to a wide variety of environments. The pluggable user repository interface provides customers with the ability to customize the user repository to their environment. The pluggable access control module allows access control information to be accessed from different storage types and locations, and also may allow different resource protection methods (e.g. group-based access control, role-based access control, IP-based access control, certificate-based access control, etc.) to be used.

Embodiments of the authentication and access control mechanism may use pluggable modules to implement an authentication and access control mechanism that may provide flexibility in the implementation of the various components described above for different applications. The pluggable modules may be exchangeable to support a variety of authentication types, user repositories, and access control models.

In one embodiment, the authentication and access control mechanism may be implemented as the following pluggable modules that each provides an Application Programming Interface (API):

A server-side authentication protocol handler module

A client-side authentication protocol handler module

A server-side access control context module

Typically, access control may be used to protect resources on the server. In one embodiment, the client may need to authenticate one or more servers. In this embodiment, the client-side authentication protocol handler module may be used in authenticating servers to which a connection is to be established.

It is noted that, even though embodiments herein may be described in respect to the client-server model, embodiments are contemplated that apply generally to any system or service where a first entity or node needs to authenticate one or more other entities or nodes that desire to connect to the first entity or node, and where the first entity or node, the connecting entity or both sides include resources to which access needs to be controlled. For example, embodiments are contemplated for connection-based, connectionless, and peer-to-peer systems and services. Thus, the pluggable modules may more generally be described as:

An authentication protocol handler module for the authenticator side.

An authentication protocol handler module for the side to be authenticated.

An access control module on the authenticator side.

The authentication protocol handler modules may implement the authentication and user repository components of the authentication and access control process. The access control context module may implement the access control component of the authentication and access control process. Using the pluggable authentication and access control mechanism, clients may access servers implementing different authentication protocols and/or access control models simply by "plugging in" a client-side authentication protocol handler module appropriate for the server being accessed.

At the beginning of connection establishment, the server and client may negotiate an authentication type through the underlying transport protocol. Then both sides may initialize an appropriate authentication protocol handler for the selected authentication type. The server-side authentication protocol handler initialization may include any initialization needed for the configured user repository. Then a challenge from the server may be sent to the client. The challenge may include initial authentication request data returned from the server-side authentication protocol handler initialization method.

The client, upon receiving the challenge from the underlying transport protocol, may pass the authentication request data to the client-side authentication protocol handler. The client-side authentication protocol handler module may include a handle request method that may receive the request, process the request and generate response data (e.g. digested user name and password or some other identification and credentials). The client then may send the response data returned from the handle request method to the server. The server may pass the authentication response data to the server-side authentication protocol handler. The server-side authentication protocol handler may include a handle response method that may access the user repository to authenticate (verify) the client using the authentication response data. This request and response process may be repeated depending on the requirements of the authentication mechanism.

If the server-side authentication protocol handler successfully authenticates the client using the user repository, the server may send a success reply to the client to inform the client that the authentication process is now complete. If the authentication fails, the server may send a failure reply to the client and the connection may be aborted. If the authentication process is successful, the server's security manager may retrieve an access control context module from the server-side authentication protocol handler. The access control context module may encapsulate the authenticated subject and any other information necessary for later access control use. The access control context module may then be initialized, which may involve loading the configured access control model.

Once the client is successfully authenticated, the client may send a service request to the server through the underlying transport protocol. A service request may request access to a protected resource. The server's security manager may interface with the access control context module to check whether the authenticated client has the necessary permission(s) to access the protected resource. The access control context module, in turn, may interface with the access control model to determine the permission. In one embodiment, the access control context module may be used to load (plug in) different access control models. That is, the access control context module may be pluggable (the API and implementation) as well as the access control model. If necessary, in one embodiment, the access control model may need to query the user repository for additional information on the authenticated subject, for example group information in case of group based access control. If it is determined that access is permitted to the resource, the authenticated client is allowed to access the resource; otherwise access to the resource is denied to the client.

Figure 1A:
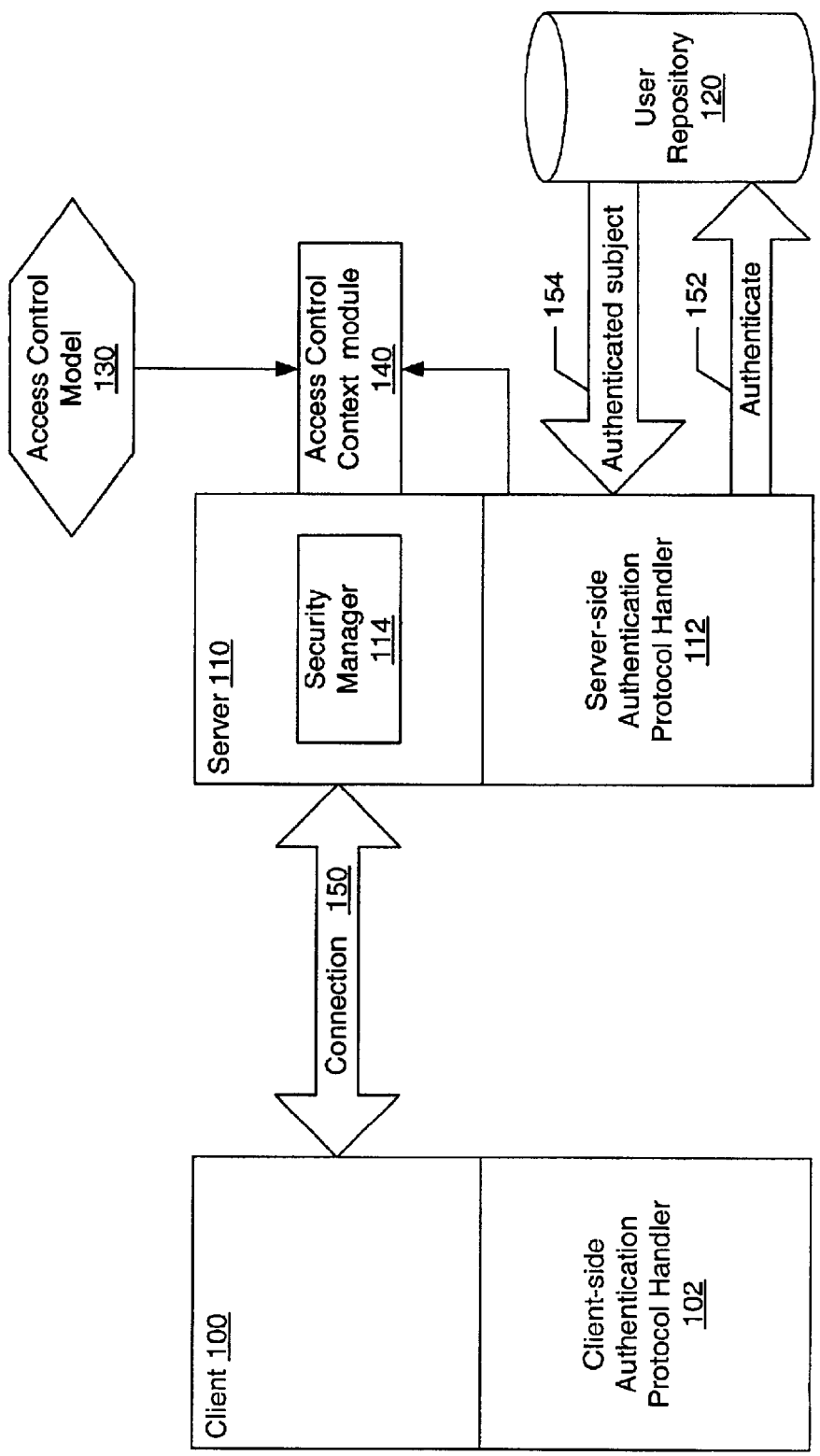
FIG. 1A illustrates a system implementing the authentication and access control mechanism according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

A system and method for providing pluggable authentication and access control in computer systems and services are described. These systems may include connection-based networked computer systems and services such as client-server systems, connectionless systems, point-to-point systems, and messaging systems. One embodiment may be used in client-server systems, where typically clients may initiate connections with one or more servers. A "client" can be any application running on one side of the network; a "server" typically provides services to the client application, running on the other side of the network.

Embodiments may be used in computer systems and services that support communications between entities in the computer systems or services in any of various transport protocols or combinations of transport protocols. Transport protocols that may be used may include, but are not limited to, TCP/IP, Hypertext Transport Protocol (HTTP), UDP (User Datagram Protocol), IrDA (Infrared Data Association), IBM's SNA (Systems Network Architecture), Novell's IPX (Internetwork Packet eXchange), and Bluetooth.

Authentication is the process of verifying someone's identity. Access control (authorization) relates to controlling access to protected resources in a system, i.e. determining who can access what protected resources. A pluggable authentication and access control mechanism may be provided that allows replacement of an authentication and/or access control module or modules at or after deployment of the system components. For example, in a client/server system, the authentication and access control process may be categorized into three components:

Authentication Protocol—The authentication protocol provides a contract between a client and server, and may define how the client and server exchange and interpret authentication information, for example, server challenges, client responses, etc. The authentication protocol component also may control how the client and server exchange authentication information, e.g. an authentication mechanism, server challenges and client responses, etc. Typically, different authentication mechanisms require different authentication protocols.

User Repository—Where and how user and credential information (e.g. used in authentication) is stored.

Access Control Model—Once authenticated, a user may require authorization to access protected resources. The access control model may define what resources are protected, the method or methods of protection, and where the authorization information is stored.

Embodiments of an authentication and access control mechanism that provide pluggability for all three components as described above are described. In one embodiment, the authentication protocol may be changed by plugging in a different authentication protocol handler module or modules. In one embodiment, the user repository may be changed without requiring the changing of the authentication protocol handler module or modules. In one embodiment, the access control model may also be changed, for example based upon the user repository being used, by plugging in a different access control module or modules. This pluggability may make the authentication and access control mechanism adaptable to a wide variety of environments. The pluggable user repository interface provides customers with the ability to customize the user repository to their environment. The pluggable access control module may allow access control information to be accessed from different storage types and locations, and also may allow different resource protection methods (e.g. group-based access control, role-based access control, IP-based access control, certificate-based access control, etc.) to be used.

The choice of security mechanisms, including what authentication protocol used in a system, may depend on factors including, but not limited to, what user and credential information is stored in a user repository, how the information is stored, network transport being used, hardware location, time of day, user preference, etc. Different authentication mechanisms may use different protocols. For example, one server may expect a user name and/or password, another server may expect a certificate or key, and still another server may expect the user name, password or other information to be encoded/encrypted differently. Information (e.g., user name, group name, role, etc.) used by the access control model in determining who can access what resource may also depend on the user repository. For example, a role-based access control model may require a user repository that supports users and roles. If the user repository module is replaced by a different user repository module that supports only users and groups, then the role-based access control model may need to be replaced by a group-based access control model as well. Thus, the authentication and access control mechanism uses pluggable modules to implement an authentication and access control mechanism that may provide flexibility in the implementation of the various components described above for different applications. The pluggable modules may be exchangeable to support a variety of authentication types, user repositories, and access control models. Examples of different authentication types may include, but are not limited to: MD5-challenge, one-time passwords, Certificates, etc.

FIG. 1A illustrates a networked system implementing the authentication and access control mechanism according to one embodiment. A client 100 and a server 110 may participate in a client-server system. An access control model 130 may define access control for resources of server 110. Client information may be maintained in a user repository 120. Server 110 may include a security manager module 114 that may provide authentication services for users requesting connections to a broker and authorization services (access control) for authenticated users.

In one embodiment, the authentication and access control mechanism may be implemented as the following pluggable modules that each provides an Application Programming Interface (API):

A server-side authentication protocol handler module 112
A client-side authentication protocol handler module 102
A server-side access control context module 140

The authentication protocol handler modules may implement the authentication and user repository components of the authentication and access control process. The access control context module 140 may implement the access control component of the authentication and access control process. Using the pluggable authentication and access control mechanism, clients 100 may access two or more servers 110 each implementing a different authentication protocols and/or access control models simply by "plugging in" a client-side authentication protocol handler module 102 appropriate for the server 110 being accessed.

Server 110 may be implemented on a single host machine or on two or more host machines. The user repository 120, server-side authentication protocol handler module 112, server-side access control context module 140, access control model 130, and security manager 114 may be implemented on the same host machine with the server 110, or on different host machines.

In one embodiment, the client-side authentication protocol handler module 102 may include, but is not limited to, the following methods:
   Get type method—returns the authentication type implemented by this authentication protocol handler module 102.
   Initialization method—called once before any handle request calls for the authentication process. This method may accept, but is not limited to, a user name, a password, and any other authentication properties needed.
   Handle request method—May be called (by the client) to handle an authentication request received from the server. May accept, but is not limited to, the following input data:
      the authentication request data.
      a packet sequence number that may be used for correlation purposes.
   The handle request method returns the response data.
   A completion method called when the authentication process completes. May accept, but is not limited to, an input indicating the success or failure of the authentication process.

In one embodiment, the server-side authentication protocol handler module 112 may include, but is not limited to, the following methods:
   Get type method—returns the authentication type implemented by this authentication protocol handler module 112.
   Initialization method—called once before any handle response calls for the authentication process. This method may accept, but is not limited to, the following input data:
      A sequence number that may be used as a start sequence number for this authentication process.
      Server authentication properties.
      Cache data, if any.
      Information indicating if the cache data is stale
   Handle response method—May be called (by the server) to handle an authentication response received from the client. May accept, but is not limited to, the following input data:
      the authentication response data.
      a packet sequence number that may be used for correlation purposes.
   The handle response method may return the next request data, if any, or may return an indication that there is no more request data. The handle response method may also return information indicating the success or failure of the authentication process.
   Log out method—may be called when the connection closes.
   Get access control context method—may be called when the authentication process successfully completes. This method returns the access control context object associated with the authenticated subject.
   Get cache data method—this method may be called when the authentication process successfully completes. On the next connection authentication, this object may be passed to the initialization method when called.

In one embodiment directed at a messaging system such as JMS that uses connection/destination access control, the access control context module 140 may include, but is not limited to, the following methods:
   Check connection permission method—checks connection permission based on the access control context. This method may accept, but is not limited to accepting, a connection type as an input. This method may return information or otherwise indicate (e.g. by throwing an exception) whether connection is allowed or denied.
   Check destination permission method—this method checks permission for an operation on a destination based on the access control context. This method may accept, but is not limited to, the following input information:
      The connection type.
      The operation requested (e.g. "produce", "consume", "browse", "create").
      The destination.
      The destination type—e.g. queue or topic.

Client 100 may initiate a connection 150 with server 110. The authentication protocol to be used between the client 100 and server 110 may then be determined. The client 100, if necessary may then initialize the appropriate client-side authentication protocol handler module 102. The server 110, if necessary may also initialize a corresponding server-side authentication protocol handler module 112.

After initializing the protocol handler modules, the server 110 may send a challenge to client 100. The client 100 may pass the challenge to the client-side authentication protocol handler module 102. The client-side authentication protocol handler module 102 may include a handle request method that may receive the authentication "challenge" from server 110 and respond to the challenge with the information required by the particular authentication protocol being used. The server may receive the response and pass the response to the server-side authentication protocol handler module 112.

The server-side authentication protocol handler module 112 may include a handle response method that may receive the response message from the client 100 and may, in response to the message, send another request to the client 100, authenticate the client 100, or determine that the client 100 cannot be authenticated in accordance with the authentication protocol being used. Authentication may be determined by providing authentication information from the client 100 to the user repository 120 as indicated at 152. If authentication is verified, then the user repository may return the authenticated subject to the server-side authentication protocol handler 112 as indicated at 154.

The symmetrical nature of the handle request and handle response methods in the authentication protocol handler modules for the server and client sides reflects the symmetrical nature of the authentication request and response process. These methods work by exchanging data between the client and server rather than by using a callback method. Also, in one embodiment, the handle request and handle response methods are not dependent on the underlying transport protocol. Thus, the APIs provided by these modules may be easy to understand and to implement. Also, the APIs provided by the server and client authentication protocol handler modules may be generic, allowing the modules to be used in a variety of systems and services.

In one embodiment, authentication protocol handler modules may be provided that support non-symmetrical authentication mechanisms, for example, single sign-on across multiple applications. In one embodiment, handle request and handle response methods may be provided that may provide authentication through a third-party authentication server.

In one embodiment, the server-side authentication protocol handler implementation may take advantage of Secure Sockets Layer (SSL) client authentication (if using the SSL transport protocol) to bypass authentication, and/or may wrap the client SSL certificate in the access control context module to support certificate-based access control model.

In one embodiment, the handle request and handle response methods in the authentication protocol handler modules for the server and client sides may have a sequence number as an input argument to the method for correlation purposes. The sequence number may be the sequence number of the underlying transport protocol packet carrying the authentication data. In one embodiment, the sequence number may be embedded in the request/response data itself. In this embodiment, the client and server side protocol handlers may provide the sequence numbers. The sequence number may be used by the authentication protocol handler modules to correlate authentication requests and responses, for example, in situations when there are multiple requests and responses.

In one embodiment, since the authentication data, returned from or passed to the handle request and handle response methods in the authentication protocol handler modules for the server and client sides, is opaque to the underlying transport protocol, encryption/decryption may be applied to the authentication data. In one embodiment, the authentication protocol handler modules may apply encryption and decryption of data as required.

In one embodiment, once the authentication process successfully completes, the server security manager 114 may be directed by the server-side authentication protocol handler module 112 to an access control context module 140. The access control context module 140 may be initialized, if necessary. In one embodiment, the server-side authentication protocol handler module 112 may include a method that may be called to get the access control context to be used in this implementation. In one embodiment, this method may return an access control context object. The access control context object may then be used to instantiate or locate the appropriate access control model 130. The access control context module 140 may then be used by the security manager 114 in handling access requests to resources of server 110 by client 100. In one embodiment, the authenticated subject and other related information may be encapsulated in the access control context module 140, and thus the security manager 114 may not need to know how the authenticated subject is represented or stored at runtime. In one embodiment, an access control model 130 appropriate for the user repository 120 in use may be determined and loaded, if necessary.

In one embodiment, the server-side access control context module 140 does not restrict how an authenticated subject is represented. However, the implementation of the access control context module API may depend upon the access control model 130 being used. This document describes embodiments of an exemplary access control context module 140 and API for the access control model 130 of a messaging system such as a Java Message Service (JMS) system that uses the connection/destination concept in access control. In this model, connection refers to a client connection to a server. A client may publish/subscribe to messages at a destination (through a connection). There may be two types of destinations. First, messages may be placed in a queue, at some point another entity may extract the messages (at which point the messages may be deleted). Second, messages may be posted to a topic, and other entities may access the posted messages from the topic based on interest.

One embodiment of the exemplary access control context module 140 for a messaging system such as a JMS system may include a check connection permission method and a check destination permission method. The access control context module 140 may be operable to protect which clients are allowed to make a connection to a server and which clients may produce and/or consume messages to destinations (topics and/or queues). In one embodiment, the sending, consumption and browsing of messages at a destination, as well as the ability to create destinations, may be protected by the access control context module 140. Both connections and destinations are protected as resources. Although the methods in the access control context module 140 as described herein are applicable to a messaging system such as the JMS system that uses the connection/destination concept, it is noted that embodiments of the system and method using other access control models are contemplated.

Figure 1B:
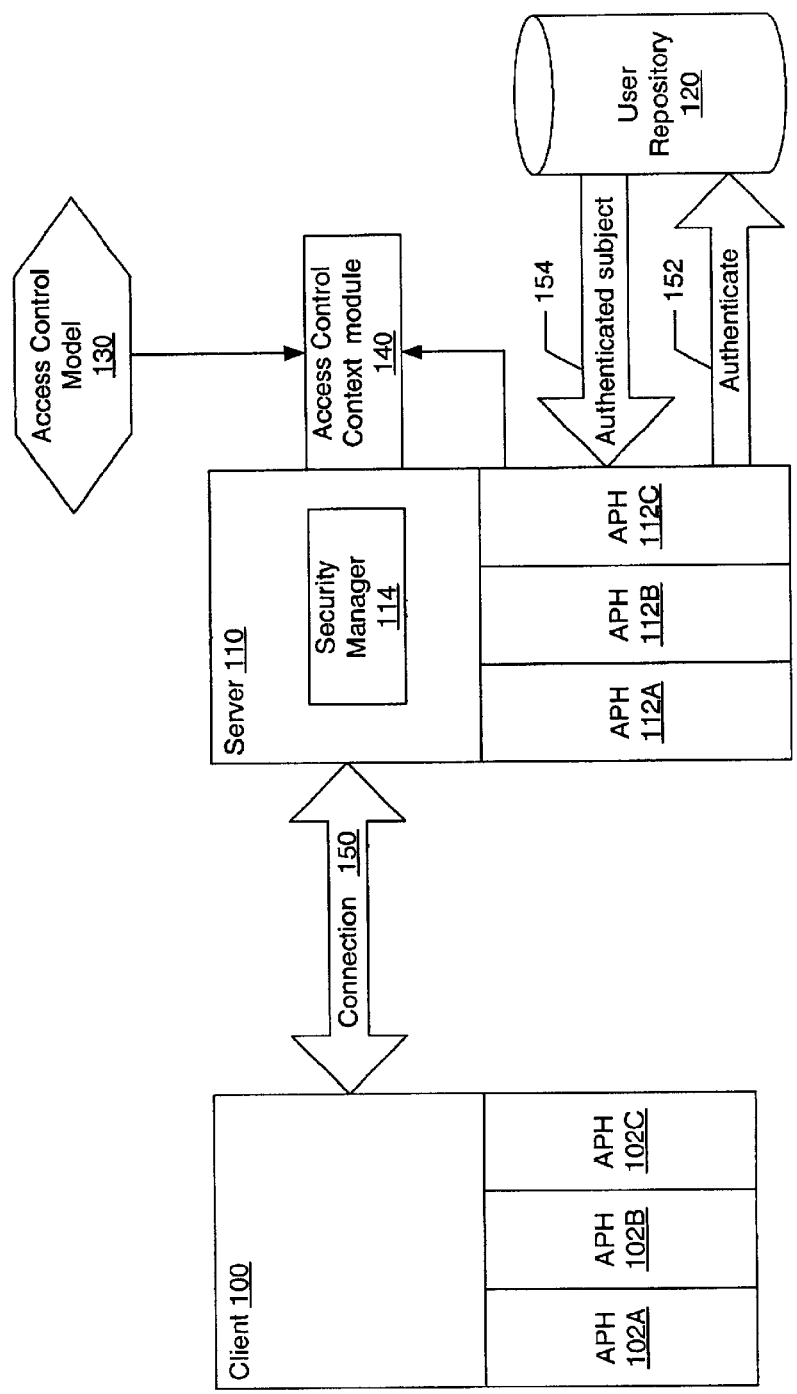
FIG. 1B illustrates a system implementing the authentication and access control mechanism according to one embodiment.

FIG. 1B illustrates a networked system implementing the authentication and access control mechanism according to one embodiment. A client 100 and a server 110 may participate in a client-server system. Access control for resources of server 110 may be defined by an access control model 130. Client information may be maintained in a user repository 120. There may be a plurality of server-side pluggable authentication protocol handler modules (APH) 112 and corresponding client side pluggable authentication protocol handler modules (APH) 102. Once an authentication type to be used between the client and server is determined, the client and server may each locate, load and initialize the appropriate protocol handler module as necessary. In this case, client-side authentication protocol handler 102C and corresponding server-side authentication protocol handler 112C are in use.

FIG. 1B further illustrates the client-side authentication protocol handler modules 102 with client 100, and the server-side authentication protocol handler modules 112 with server 110. Note, however, that an authentication protocol handler module may actually reside on another system (e.g. another server or a peer in a peer-to-peer system) and may be downloaded to the client 100 or server 110 when required. For example, server 110 may store client-side authentication protocol handler modules 102, and a copy of the appropriate module 102 may be provided to the client 100 during the connection process.

Figure 2:
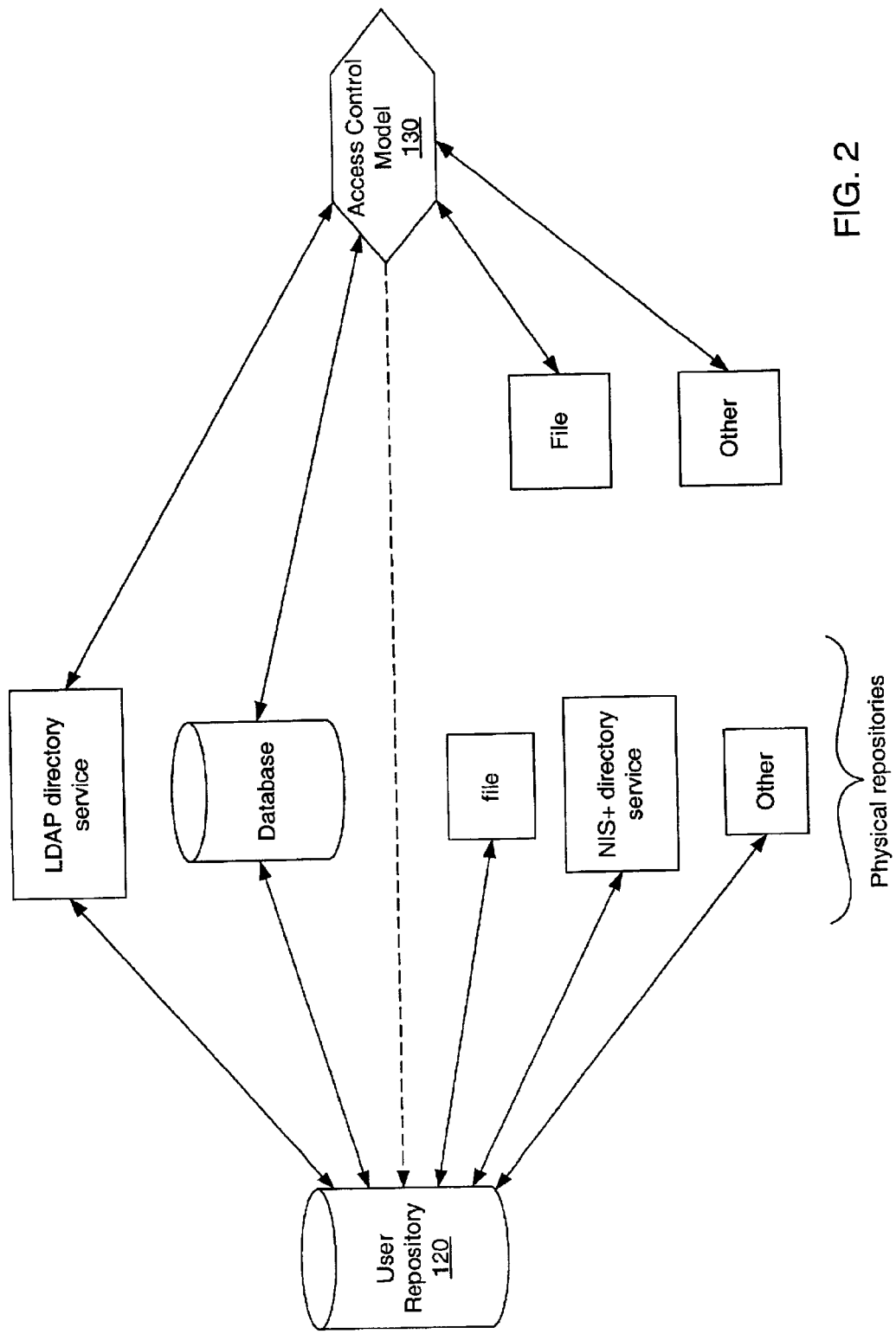
FIG. 2 illustrates a user repository 120 and its relation to an access control model 130 according to one embodiment.

FIG. 2 illustrates a user repository 120 and its relation to an access control model 130 according to one embodiment. User repository 120 may be implemented in a variety of ways, including, but not limited to, as an LDAP directory service, a database, a flat file, an NIS+ directory service, etc. The server-side authentication protocol handler module 112 may access the user repository during authentication of the client 100. The access control model 130 and access control context module 140 may also need to access user information when handling access requests from the client 100. In one embodiment, the access control information that the access control model uses may be kept in the same physical repository as the user repository 120. In another embodiment, the access control information may be implemented in a separate physical repository from the user repository 120. The access control information may be implemented in a data repository such as an LDAP directory service, a database such as an RDMS database, a flat file, etc. In yet another embodiment, portions of the access control information may be kept in different physical repositories.

As an example, a company may keep employee information in an LDAP server. Employee information may be kept on the LDAP server. The server-side authentication protocol handler module 112 may access the employee information during authentication to determine if a client is a valid employee. The access control context module 140 may access employee information from the LDAP server during access control of on-line company resources. Alternatively, the employee information necessary for access control may be kept in a flat file on a server separate from the LDAP server.

In one embodiment, the access control model and the user repository may use the same repository to store access control information for the access control model and user identity and credential information for authentication. In another embodiment, separate repositories may be used. For example, user authentication information may be stored in an LDAP directory and access control information may be stored in a flat file. In one embodiment where the access control information and authentication information are stored in different physical repositories, the access control model may access the user repository for certain user information in determining resource access permission.

Figure 3:
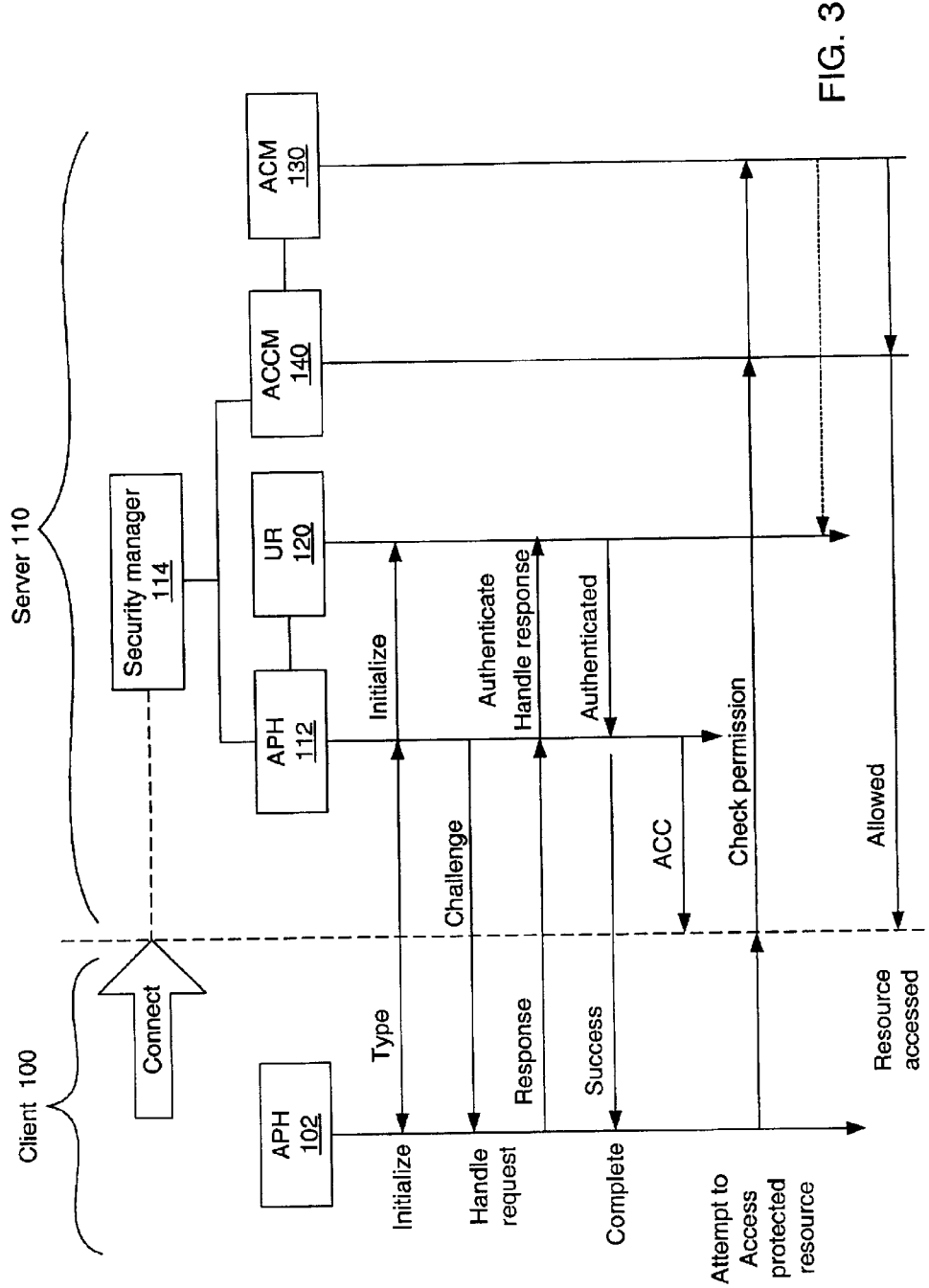
FIG. 3 is a flow diagram illustrating the use of the authentication and access control mechanism to authenticate a client 100 and provide access control for resources of a server 110 according to one embodiment.

FIG. 3 is a flow diagram illustrating the use of the authentication and access control mechanism to authenticate a client 100 and provide access control for resources of a server 110 according to one embodiment. Note that, in one embodiment, communications between the client and the server during connection establishment, authentication, and access of resources may flow through the security manager 114. At the beginning of connection establishment, the server 110 and client 100 may negotiate an authentication type through the underlining transport protocol. Then both sides may initialize an appropriate authentication protocol handler for the selected authentication type. The server-side authentication protocol handler initialization may include any initialization needed for the configured user repository. Then a challenge from the server 110 may be sent to the client 100. The challenge may include initial authentication request data returned from the server-side authentication protocol handler (APH) 112 initialization method.

The client 100, upon receiving the challenge from the underlying transport protocol, may pass the authentication request data to the client-side authentication protocol handler (APH) 102. The client-side authentication protocol handler's handle request method may then process the request and generate response data (e.g. digested user name and password or some other identification and credentials). The client 100 then may send the response data returned from the handle request method to the server 110. The server 110 then may pass the authentication response data to the server-side authentication protocol handler 112. The server-side authentication protocol handler's handle response method may then access the user repository (UR) 120 to authenticate (verify) the client (e.g. the user name and password). This request and response process may be repeated depending on the requirements of the authentication mechanism.

If the server-side authentication protocol handler 112 successfully authenticates the client using the user repository 120, the server 110 may send a success reply to the client 100 to inform the client 100 that the authentication process is now complete. If the authentication fails, the server 110 may send a failure reply to the client 100 and the connection may be aborted. If the authentication process is successful, the server's security manager 114 may retrieve an access control context module 140 from the server-side authentication protocol handler 112. The access control context module (ACCM) 140 may encapsulate the authenticated subject and any other information necessary for later access control use. The access control context module 140 may then be initialized, which may involve loading the configured access control model (ACM) 130.

Once the client 100 is successfully authenticated, the client may send service requests to the server 110 through the underlying transport protocol. A service request may request access to a protected resource (for example, in a JMS system, a destination). The server's security manager 114 may interface with the access control context module 114 to check whether the authenticated client 100 has the necessary permission to access the protected resource. The access control context module 140, in turn, may interface with its associated access control model 130 to determine the permission. If necessary, in one embodiment, the access control model 130 may need to query the user repository 120 for additional information on the authenticated subject, for example group information in case of group based access control. If access is permitted to the resource, the authenticated client 100 is allowed to access the resource; otherwise access is denied.

Figure 4:
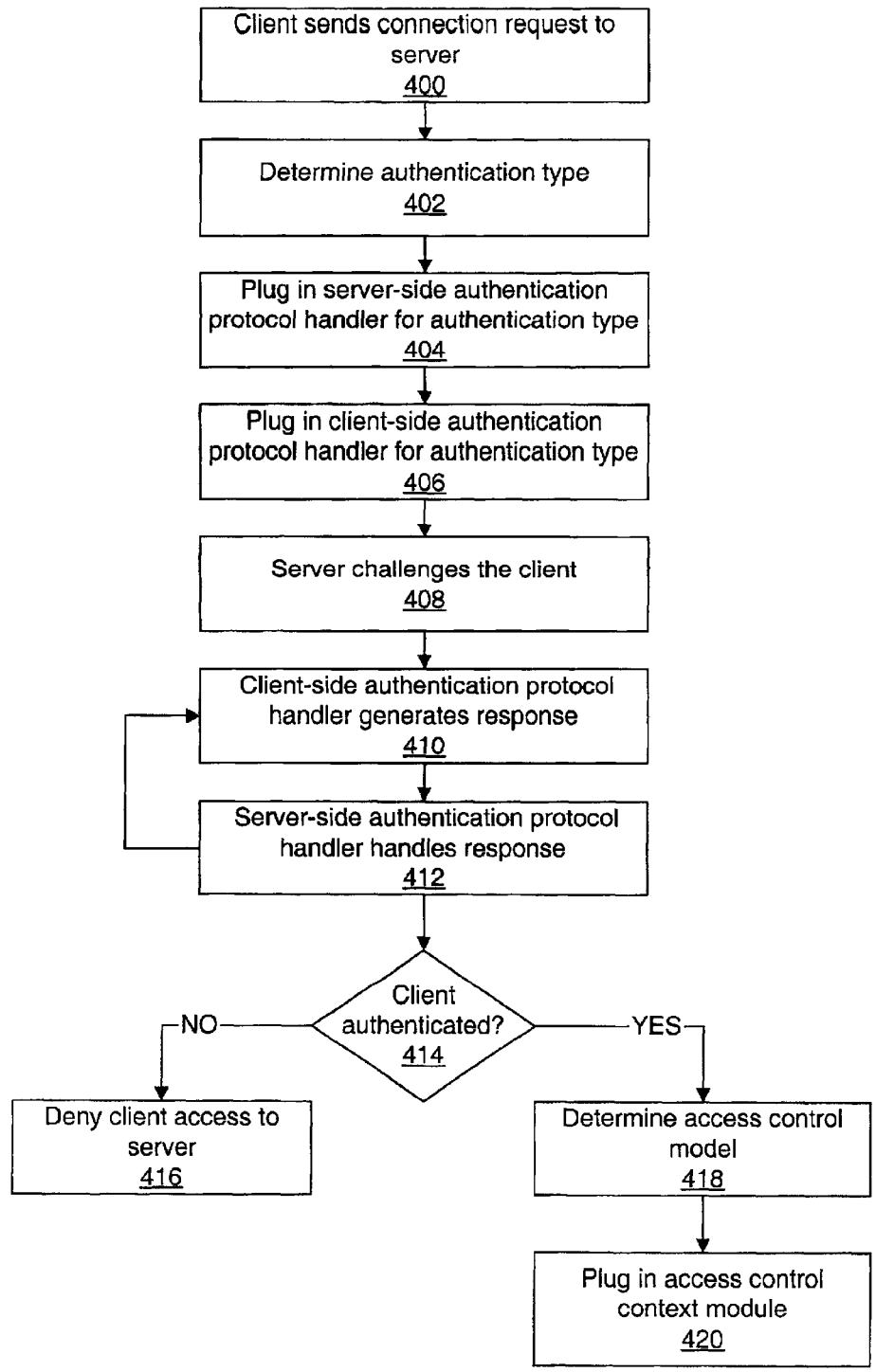
FIG. 4 is a flowchart illustrating a method of authenticating a client according to one embodiment.

FIG. 4 is a flowchart illustrating a method of authenticating a client according to one embodiment. As indicated at

400, a client may first send a connection request to a server. The type of authentication to be used by the server for the client may then be determined as indicated at 402. In one embodiment, the server and client may negotiate to determine an appropriate authentication type. Once the authentication type is determined, a server-side authentication protocol handler for the authentication type may be located and plugged in as indicated at 404. As indicated at 406, a client-side authentication protocol handler for the authentication type may also be located and plugged in. In one embodiment, the server may provide the client-side authentication protocol handler to the client. The server then may send a challenge to the client as indicated at 408. The client may pass the challenge to the client-side authentication protocol handler, which may generate a response to the challenge as indicated at 410. In one embodiment, a handle request method of the client-side authentication protocol handler may generate the response. The response may include client information for use by the server in authenticating the client.

The server may receive the response from the client and pass the response to the server-side authentication protocol handler. The server-side authentication protocol handler may then examine the response to determine if the client is authentic as indicated at 412. In one embodiment, the server-side authentication protocol handler may pass the response, or alternatively the client information from the response, to a user repository, which may compare the client information to information for one or more clients of the server kept in the user repository. In another embodiment, the server-side authentication protocol handler may itself compare the client information to information for one or more clients. The comparison may determine if the client is authentic (i.e. that the client information is authentic, and is consistent with client information in the user repository). Note that, in one embodiment, a series of requests and responses may be sent between the client and the server during the authentication process. At 414, if the comparison determines the client is not authentic, the client is denied access to the server as indicated at 416. At 414, if the comparison determines the client is authentic, the client is granted access to the server. The server-side authentication protocol handler may then determine an access control model to be used as indicated at 418. Once the access control model is determined, an access control context module for the determined access control model may be located or alternatively generated and plugged in as indicated at 420. In one embodiment, the server-side authentication protocol handler may return an access control context module object to the security manager, and the access control context module then may determine (e.g. during initialization) an access control model to be used (i.e. plugged in) based on the configuration.

Figure 5:
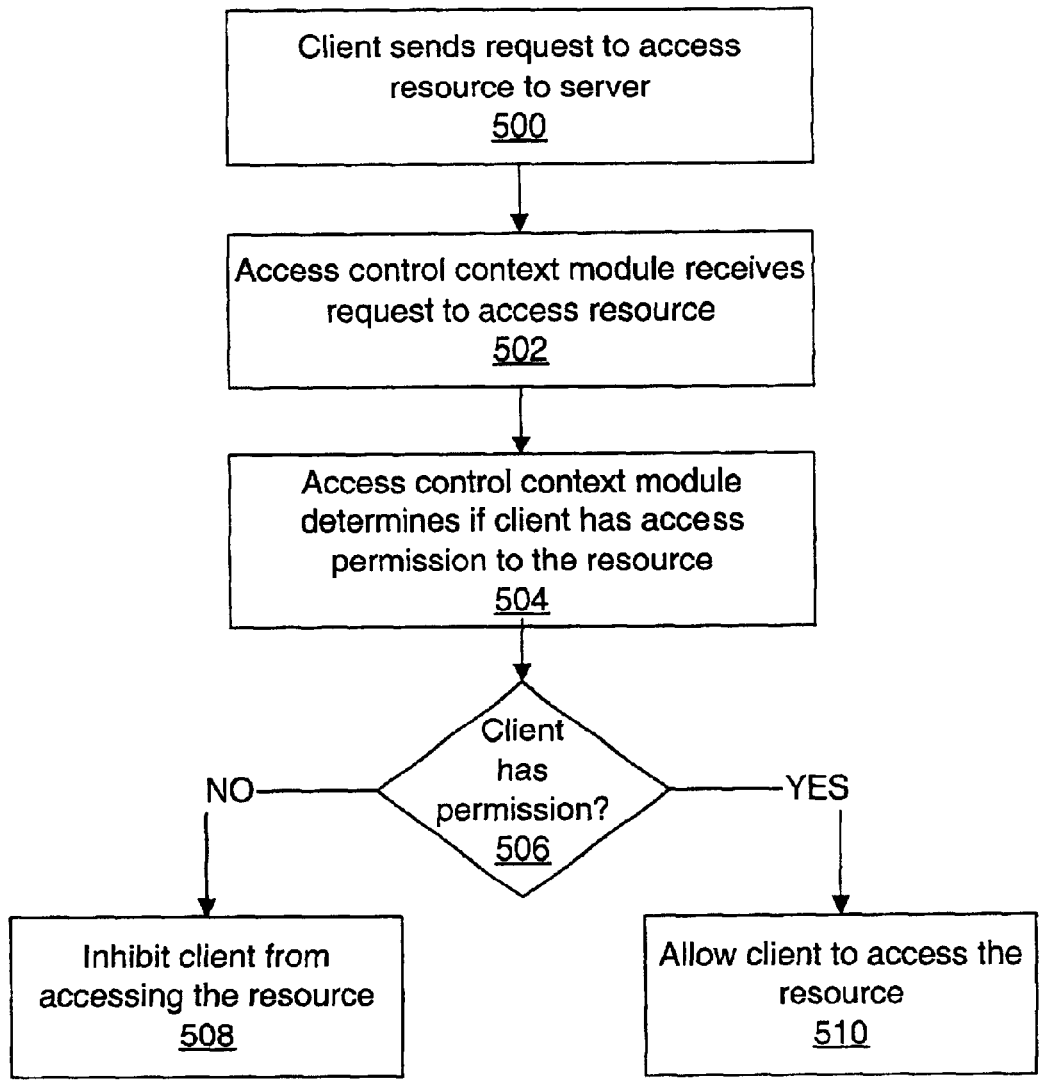
FIG. 5 is a flowchart illustrating a method of access control to server resources according to one embodiment.

FIG. 5 is a flowchart illustrating a method of access control to server resources according to one embodiment. After the client is authenticated, the access control model is determined, and the access control context module is initialized, the client may send to the server a request to access a resource of the server as indicated at 500. The access control context module may receive the request to access the resource as indicated at 502. The access control context module then may determine if the client has access permission to the resource as indicated at 504. At 506, if the client does not have access permission to the resource, then the server may inhibit the client from accessing the resource as indicated at 508. At 506, if the client does have access permission to the resource, then the server may allow client to access the resource as indicated at 510.

The methods as described in FIGS. 3, 4 and 5 may be implemented in software, hardware, or a combination thereof. The order of method may be changed, and various steps may be added, reordered, combined, omitted, modified, etc.

Implementation in a JMS-Based Messaging Service

Figure 6:
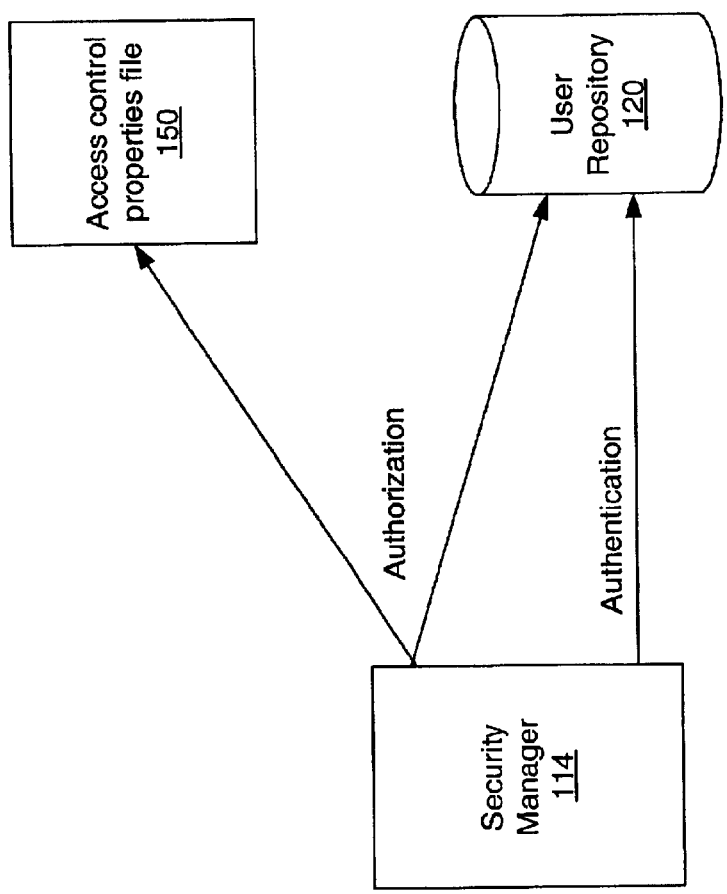
FIG. 6 is a block diagram illustrating the security manager accessing the user repository and an access control properties file.

This section describes an exemplary implementation of one embodiment of the authentication and access control mechanism in an exemplary messaging system. This section is included for illustrative purposes and is not intended to be limiting. The exemplary messaging system is iPlanet E-Commerce Solutions' iMQ (iPlanet Message Queue). iMQ provides authentication and authorization (access control) features, and also supports encryption capabilities. The authentication and authorization features depend upon a user repository: a file, directory, or database that contains information about the users of the messaging system—their names, passwords, and group memberships. The names and passwords are used to authenticate a user when a connection to a broker is requested. The user names and group memberships are used, in conjunction with an access control file, to authorize operations such as producing or consuming messages for destinations. iMQ administrators may populate an iMQ-provided user repository, or alternatively plug a pre-existing LDAP user repository into the iMQ Security Manager component.

iMQ security supports password-based authentication. When a client requests a connection to a broker, the client must submit a user name and password. The iMQ Security Manager 114 compares the name and password submitted by the client to those stored in the user repository 120 as illustrated in FIG. 6. Note that, in one embodiment, the security manager 114 may access the user repository 120 through a pluggable server-side authentication protocol handler module 112. On transmitting the password from client to broker, the passwords may be encoded using either base64 encoding or message digest, MD5. The type of encoding used by each connection service may be separately configured, or alternatively the encoding may be set on a broker-wide basis.

Once the user of a client application has been authenticated, the user can be authorized to perform various iMQ-related activities. The iMQ Security Manager supports both user-based and group-based access control: depending on a user's name or the groups to which the user is assigned in the user repository 120, that user has permission to perform certain iMQ operations. These access controls may be specified in an access control properties file 150 as illustrated in FIG. 6. When a user attempts to perform an operation, the Security Manager 114 checks the user's name and group membership (from the user repository 120) against those specified for access to that operation (in the access control properties file 150). The access control properties file may specify permissions for the following operations:

establishing a connection to an iMQ connection service with a broker accessing destinations: creating a consumer, a producer, or a queue browser for any given destination or all destinations auto-creating destinations Note that, in one embodiment, the security manager 114 may access the user repository 120 through a pluggable authentication protocol handler 112, and may also access the access control properties file 150 through a pluggable access control context module 140 and an access control model 130.

In one embodiment, the default access control properties file 150 explicitly references only one group: admin. A user in the admin group has admin service connection permission. The admin service lets the user perform administrative functions such as creating destinations, and monitoring and controlling a broker. A user in any other defined group cannot, by default, get an admin service connection.

An iMQ administrator may define groups and associate users with those groups in a user repository. Then, by editing the access control properties file, the administrator may specify access to destinations by users and groups for the purpose of producing and consuming messages, or browsing messages in queue destinations. The administrator may make individual destinations or all destinations accessible only to specific users or groups. In addition, if the broker is configured to allow auto-creation of destinations, the administrator may control for whom the broker can auto-create destinations by editing the access control properties file.

Configurable properties for authentication and authorization in iMQ may include, but are not limited to:

authentication.type—Specifies whether password should be passed in base64 coding (basic) or as a MD5 digest (digest). Sets encoding for all connection services supported by a broker. Default: digest.

service name.authentication.type—Specifies whether password should be passed in base64 coding (basic) or as a MD5 digest (digest). Sets encoding for named connection service, overriding any broker-wide setting. Default: inherited from the value to which authentication.type is set.

authentication.basic.user_repository—Specifies (for base64 coding) the type of user repository used for authentication, either file-based (file) or LDAP (ldap). Default: file.

authentication.client.response.timeout—Specifies the time (in seconds) the system will wait for a client to respond to an authentication request from the broker. Default: 180 seconds.

accesscontrol.enabled—Sets access control (true/false) for all connection services supported by a broker. Indicates whether system will check if an authenticated user has permission to use a connection service or to perform specific iMQ operations with respect to specific destinations, as specified in the access control properties file. Default: true.

service_name.accesscontrol.enabled—Sets access control (true/false) for named connection service, overriding broker-wide setting. Indicates whether system will check if an authenticated user has permission to use the named connection service or to perform specific iMQ operations with respect to specific destinations, as specified in the access control properties file. Default: inherits the setting of the property accesscontrol.enabled.

accesscontrol.file.filename—Specifies the name of an access control properties file for all connection services supported by a broker. The file name specifies a relative file path to a security directory. Default: accesscontrol.properties.

service_name.accesscontrol.file.filename—Specifies the name of an access control properties file for named connection service. The file name specifies a relative file path to a security directory. Default: inherits the setting specified by accesscontrol.file.filename.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

In summary, a system and method for providing pluggable authentication and access control in computer systems and services have been disclosed. It will be appreciated by those of ordinary skill having the benefit of this disclosure that the illustrative embodiments described above are capable of numerous variations without departing from the scope and spirit of the invention. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method comprising:
   determining an authentication type to be used between a first node and a second node in a networked computer system;
   plugging in a first authentication protocol handler pluggable module on the first node for the determined authentication type, wherein the first authentication protocol handler module is configured for use in generating, for sending to the second node, authentication information for the first node;
   plugging in a second authentication protocol handler pluggable module on the second node for the determined authentication type, wherein the second authentication protocol handler module is configured for use in determining if the first node is authentic using the first node authentication information;
   determining an access control model to be used by the second node in controlling access by the first node to resources of the second node; and
   plugging in an access control context pluggable module for the determined access control model on the second node, wherein the access control context module is configured for use in controlling access by the first node to resources of the second node using the access control model.

2. The method as recited in claim 1, further comprising loading the determined access control model.

3. The method as recited in claim 1, wherein the access control context module encapsulates information configured for use in controlling access by the first node to the resources of the second node.

4. The method as recited in claim 1, wherein the first authentication protocol handler module includes a handle request method, wherein the second authentication protocol handler module includes a handle response method, wherein the handle request method and handle response method are configured to exchange authentication information during an authentication process for the first node.

5. The method as recited in claim 1, further comprising:
   the second node sending a challenge to the first node, wherein the challenge is in accordance with the determined authentication type;
   the first authentication protocol handler module generating response data in response to the challenge, wherein the response data includes information for use in authenticating the first node;

the first node sending the response data to the second node; and the second authentication protocol handler module authenticating the first node using the received response data.

6. The method as recited in claim 5, wherein said authenticating the first node using the received response data comprises:

the second authentication protocol handler module sending the received response data to a user repository, wherein the user repository comprises node information associated with one or more network nodes; and the user repository comparing the response data to the node information to authenticate the first node.

7. The method as recited in claim 1, further comprising:

authenticating the first node using the first authentication protocol handler module and the second authentication protocol handler module;

the authenticated first node sending to the second node a request for access to a resource of the second node; and the access control context module determining if the first node has access permission to the resource in response to the request for access to the resource of the second node.

8. The method as recited in claim 7, further comprising:

if said determining determines the first node has access permission to the resource, allowing the first node to access the resource; and if said determining determines the first node does not have access permission to the resource, inhibiting the first node from accessing the resource.

9. The method as recited in claim 1, wherein the second authentication protocol handler module is further configured for use in generating, for sending to the first node, authentication information for the second node; and wherein the first authentication protocol handler module is further configured for use in determining if the second node is authentic using the second node authentication information.

10. The method as recited in claim 1, wherein the networked computer system is a messaging-based system.

11. The method as recited in claim 1, wherein the networked computer system uses the Java Message Service (JMS) to support messaging between nodes in the network.

12. The method as recited in claim 1, wherein networked computer system is a client-server system, wherein the first node is a client in the client-server system, and wherein the second node is a server in the client-server system.

13. The method as recited in claim 1, wherein the networked computer system is a peer-to-peer system, wherein the first node and the second node are peers in the peer-to-peer system.

14. A method for authenticating nodes in a networked computer system, comprising:

a first node initiating a connection to a second node in the networked computer system;

determining an authentication type to be used by the first node and the second node;

initializing a first authentication protocol handler on the first node for the determined authentication type;

initializing a second authentication protocol handler on the second node for the determined authentication type;

the second node sending a challenge to the first node, wherein the challenge is in accordance with the determined authentication type;

the first authentication protocol handler generating response data in response to the challenge, wherein the response data includes information for use in authenticating the first node;

the first node sending the response data to the second node; and the second authentication protocol handler authenticating the first node using the received response data;

wherein the first authentication protocol handler and the second authentication protocol handler are pluggable modules configured to be replaced to support different authentication types.

if the first node is successfully authenticated:

determining an access control model to be used by the second node for the first node; and initializing an access control context module for the determined access control model, wherein the access control context module is configured for use in controlling access to resources of the second node by the first node using the access control model.

15. The method as recited in claim 14, wherein said authenticating the first node using the received response data comprises:

the second authentication protocol handler sending the received response data to a user repository, wherein the user repository comprises node information associated with one or more nodes; and the user repository comparing the response data to the node information to authenticate the first node.

16. The method as recited in claim 14, wherein the access control context module is a pluggable module configured to be replaced to support different access control models.

17. The method as recited in claim 14, wherein the access control context module is configured to support different pluggable access control models.

18. The method as recited in claim 14, further comprising loading the determined access control model.

19. The method as recited in claim 14, wherein the access control context module encapsulates information configured for use in controlling access by the first node to the resources of the second node.

20. The method as recited in claim 14, further comprising:

the first node sending to the second node a request for access to a resource of the second node;

the access control context module determining if the first node has access permission to the resource;

if said determining determines the first node has access permission to the resource, allowing the first node to access the resource; and if said determining determines the first node does not have access permission to the resource, inhibiting the first node from accessing the resource.

21. The method as recited in claim 14, wherein the networked computer system is a messaging-based system.

22. The method as recited in claim 14, wherein the networked computer system uses the Java Message Service (JMS) to support messaging between entities in the network.

23. The method as recited in claim 14, wherein networked computer system is a client-server system, wherein the first node is a client in the client-server system, and wherein the second node is a server in the client-server system.

24. The method as recited in claim 14, wherein the networked computer system is a peer-to-peer system, wherein the first node and the second node are peers in the peer-to-peer system.

25. A method comprising:
a second node determining an authentication type to be used by the second node to authenticate a first node in a networked computer system;
the second node plugging in a second authentication protocol handler pluggable module for the determined authentication type, wherein the second authentication protocol handler module is configured for use in determining if the first node is authentic using authentication information associated with the first node, wherein the first node authentication information is generated by a pluggable first authentication protocol handler module on the first node for the determined authentication type;
the second node determining an access control model to be used by the second node for the first node; and
the second node plugging in an access control context pluggable module for the determined access control model, wherein the access control context module is configured for use in controlling access to resources of the second node by the first node using the access control model.

26. The method as recited in claim 25, wherein the access control context module encapsulates information configured for use in controlling access by the first node to the resources of the second node.

27. The method as recited in claim 25, wherein the second authentication protocol handler module includes a handle response method, wherein the handle response method is configured to exchange authentication information with a corresponding a handle request method of the first authentication protocol handler module during an authentication process for the first node.

28. The method as recited in claim 25, further comprising:
the second node sending a challenge to the first node, wherein the challenge is in accordance with the determined authentication type;
the second authentication protocol handler module receiving response data in response to the challenge, wherein the response data includes information for use in authenticating the first node, and wherein the response data is generated by the first authentication protocol handler module; and
the second authentication protocol handler module authenticating the first node using the received response data.

29. The method as recited in claim 28, wherein said authenticating the first node using the received response data comprises:
the second authentication protocol handler module sending the received response data to a user repository, wherein the user repository comprises node information associated with one or more nodes; and
the user repository comparing the response data to the node information to authenticate the first node.

30. The method as recited in claim 25, further comprising:
authenticating the first node;
the access control context module receiving a request for access to a resource of the second node from the authenticated first node; and
the access control context module determining if the first node has access permission to the resource in response to the request for access to the resource of the second node.

31. The method as recited in claim 30, further comprising:
if said determining determines the first node has access permission to the resource, the second node allowing the first node to access the resource; and
if said determining determines the first node does not have access permission to the resource, the second node inhibiting the first node from accessing the resource.

32. The method as recited in claim 25, wherein the networked computer system is a messaging-based system.

33. The method as recited in claim 25, wherein the networked computer system uses the Java Message Service (JMS) to support messaging between entities in the network.

34. The method as recited in claim 25, wherein networked computer system is a client-server system, wherein the first node is a client in the client-server system, and wherein the second node is a server in the client-server system.

35. The method as recited in claim 25, wherein the networked computer system is a peer-to-peer system, wherein the first node and the second node are peers in the peer-to-peer system.

36. A system comprising:
a first node comprising a first memory, wherein the first memory comprises first program instructions executable within the first node to initiate a connection request to the second node;
a second node comprising a second memory, wherein the second memory comprises second program instructions;
wherein the second program instructions are executable within the second node to:
determine an authentication type for use in authentication of the first node in response to the first program instructions initiating a connection request to the second node;
initialize a second authentication protocol handler module on the second node for the determined authentication type;
determine an access control model to be used by the second node; and
initialize an access control context module for the determined access control model, wherein the access control context module is configured for use in controlling access to resources of the second node by the first node using the access control model;
wherein the first program instructions are further executable within the first node to initialize a first authentication protocol handler module on the first node for the determined authentication type; and
wherein the first authentication protocol handler module and the second authentication protocol handler module are pluggable modules configured to be replaced to support different authentication types.

37. The system as recited in claim 36, wherein the access control context module is a pluggable module configured to be replaced to support different access control models.

38. The system as recited in claim 36, wherein the access control context module is configured to support different pluggable access control models.

39. The system as recited in claim 36, wherein the access control context module encapsulates information configured for use in controlling access by the first node to the resources of the second node.

40. The system as recited in claim 36, wherein the second program instructions are further executable within the second node to:
send a challenge to the first node, wherein the challenge is in accordance with the determined authentication type;

wherein the first authentication protocol handler module is executable within the first node to generate response data in response to the challenge, wherein the response data includes information for use in authenticating the first node;

wherein the first program instructions are further configured to send the response data generated by the first authentication protocol handler module to the second node; and wherein the second authentication protocol handler module is executable within the second node to authenticate the first node using the received response data.

41. The system as recited in claim 40, wherein the second node further comprises a user repository comprising information associated with one or more nodes, and wherein, in said authenticating the first node using the received response data, the second authentication protocol handler module is further executable within the second node to compare the response data received from the first node to the node information in the user repository to authenticate the first node.

42. The system as recited in claim 36, wherein the second authentication protocol handler module is executable within the second node to exchange information with the first authentication protocol handler module executing within the first node to authenticate the first node;

wherein the first program instructions are further executable within the first node to send to the second node a request for access to a resource of the second node; and wherein the access control context module is executable within the second node to determine if the first node has access permission to the resource in response to the request for access to the resource of the second node.

43. The system as recited in claim 42, wherein the second program instructions are further executable within the second node to:

allow the first node to access the resource if said determining determines the first node has access permission to the resource; and inhibit the first node from accessing the resource if said determining determines the first node does not have access permission to the resource.

44. The system as recited in claim 36, wherein the system is a messaging-based system.

45. The system as recited in claim 36, wherein system uses the Java Message Service (JMS) to support messaging between the first node and the second node.

46. The system as recited in claim 36, wherein the system is a client-server system, wherein the second node is a server node, wherein the second program instructions are further executable within the second node to implement a server, and wherein the first node is a client node, wherein the first program instructions are further executable within the first node to implement a client application.

47. The system as recited in claim 36, wherein the system is a peer-to-peer system, wherein the first node and the second node are peers in the peer-to-peer system.

48. A system comprising:

a first node comprising a first memory, wherein the first memory comprises first program instructions executable within the client node to implement a client application;

a second node comprising a second memory, wherein the second memory comprises second program instructions executable within the second node to implement a server;

wherein the server is executable within the server node to:
  receive a connection request from the client application;
  determine an authentication type for use in authentication of the client application in response to the connection request;
  plug in a server-side authentication protocol handler pluggable module for the determined authentication type;

wherein the client application is executable within the client node to plug in a client-side authentication protocol handler pluggable module for the determined authentication type;

wherein the client-side authentication protocol handler module is executable within the client node to:
  receive a challenge from the server, wherein the challenge is in accordance with the determined authentication type;
  generate response data in response to the received challenge, wherein the response data includes information for use in authenticating the client application;

wherein the server-side authentication protocol handler module is executable within the server node to:
  receive the generated response data; and
  authenticate the client application using the received response data;

wherein, if the client is successfully authenticated, the server is further executable within the server node to:
  determine an access control model to be used by the server for the client application; and
  plug in an access control context module for the determined access control model, wherein the access control context module is configured for use by the server in controlling access to resources of the server by the client application.

49. The system as recited in claim 48, wherein the server node further comprises a user repository comprising client information associated with one or more clients, and wherein, in said authenticating the client application using the received response data, the server-side authentication protocol handler module is further executable within the server node to compare the received response data to the client information in the user repository to authenticate the client.

50. The system as recited in claim 48, wherein the access control context module encapsulates information configured for use in controlling access to the resources of the server by the client.

51. The system as recited in claim 48, wherein the access control context module is executable within the server node to:

receive a request for access to a resource of the server from the client application;

determine if the client application has access permission to the resource;

if said determining determines the client application has access permission to the resource, permitting the client application to access the resource; and if said determining determines the client application does not have access permission to the resource, inhibiting the client application from accessing the resource.

52. The system as recited in claim 48, wherein the system is a messaging-based system.

53. The system as recited in claim 48, wherein the system uses the Java Message Service (JMS) to support messaging between entities in the system.

54. A server system comprising:
a memory, wherein the memory comprises program instructions executable within the server node to implement a server;
wherein the server is executable within the server node to:
receive a connection request from a client application;
determine an authentication type for use in authentication of the client application in response to the connection request;
plug in a server-side authentication protocol handler pluggable module for the determined authentication type; and
send a challenge to the client application, wherein the challenge is in accordance with the determined authentication type;
wherein the server-side authentication protocol handler module is executable within the server system to
receive response data from the client application, wherein the response data was generated by a pluggable client-side authentication protocol handler module in response to the challenge, wherein the response data includes information for use in authenticating the client application; and
authenticate the client application using the received response data.

55. The server system as recited in claim 54, wherein the server system further comprises a user repository comprising client information associated with one or more clients of the server, and wherein, in said authenticating the client application using the received response data, the server-side authentication protocol handler module is further executable within the server system to compare the received response data to the client information in the user repository to authenticate the client.

56. The server system as recited in claim 54, wherein, if the client is successfully authenticated, the server is further executable within the server system to:
determine an access control model to be used by the server for the client application; and
plug in an access control context pluggable module for the determined access control model, wherein the access control context module is configured for use by the server in controlling access to resources of the server by the client application.

57. The server system as recited in claim 56, wherein the access control context module encapsulates information configured for use in controlling access to the resources of the server by the client.

58. The server system as recited in claim 56, wherein the access control context module is executable within the server node to:
receive a request for access to a resource of the server from the client application;
determine if the client application has access permission to the resource;
if said determining determines the client application has access permission to the resource, permitting the client application to access the resource; and
if said determining determines the client application does not have access permission to the resource, inhibiting the client application from accessing the resource.

59. The server system as recited in claim 54, wherein the server system is a messaging-based system.

60. The server system as recited in claim 54, wherein the server system uses the Java Message Service (JMS) to support messaging between entities in the system.

61. A tangible computer accessible medium comprising program instructions, wherein the program instructions are computer-executable to implement:
a first node initiating a connection to a second node in a networked computer system;
determining an authentication type to be used by the first node and the second node;
initializing a first authentication protocol handler on the first node for the determined authentication type;
initializing a second authentication protocol handler on the second node for the determined authentication type;
the second node sending a challenge to the first node, wherein the challenge is in accordance with the determined authentication type;
the first authentication protocol handler generating response data in response to the challenge, wherein the response data includes information for use in authenticating the first node;
the first node sending the response data to the second node; and
the second authentication protocol handler authenticating the first node using the received response data;
wherein the first authentication protocol handler and the second authentication protocol handler are pluggable modules configured to be replaced to support different authentication types;
wherein, if the first node is successfully authenticated, the program instructions are further computer-executable to implement:
determining an access control model to be used by the second node for the first node; and
initializing an access control context module for the determined access control model, wherein the access control context module is configured for use in controlling access to resources of the second node by the first node using the access control model.

62. The computer accessible medium as recited in claim 61, wherein, in said authenticating the first node using the received response data, the program instructions are further computer-executable to implement comparing the response data to information comprised in a user repository, wherein the information is associated with one or more nodes.

63. The computer accessible medium as recited in claim 61, wherein the access control context module is a pluggable module configured to be replaced to support different access control models.

64. The computer accessible medium as recited in claim 61, wherein the access control context module is configured to support different pluggable access control models.

65. The computer accessible medium as recited in claim 61, wherein the program instructions are further computer-executable to implement:
the first node sending to the second node a request for access to a resource of the second node;
the access control context module determining if the first node has access permission to the resource;
if said determining determines the first node has access permission to the resource, allowing the first node to access the resource; and if said determining determines the first node does not have access permission to the resource, inhibiting the first node from accessing the resource.

66. The computer accessible medium as recited in claim 61, wherein networked computer system is a client-server system, wherein the first node is a client in the client-server system, and wherein the second node is a server in the client-server system.

67. The computer accessible medium as recited in claim 61, wherein the networked computer system is a peer-to-peer system, wherein the first node and the second node are peers in the peer-to-peer system.

* * * * *